Patented Aug. 31, 1926.

1,597,838

UNITED STATES PATENT OFFICE.

JOSEPH W. STEVENS, OF NEW YORK, N. Y.

MEDICINAL COMPOSITION.

No Drawing.      Application filed July 30, 1925.  Serial No. 47,133.

This invention is a medicinal composition which enables metallic mercury, more particularly in the form of vapor, to be administered by inhalation in a simple, controllable and highly effective manner.

Broadly speaking, the invention, in its preferred specific form, comprises a mixture of specially prepared corn cobs and metallic mercury, the composition being adapted, when ignited, to burn slowly with evolution of the mercury vapors gradually, uniformly and with such speed as to enable them to be inhaled by the patient efficaciously.

The pronounced therapeutic value of mercury vapor, particularly in the treatment of syphilitic ailments has long been recognized, but difficulties heretofore existing in its administration have very greatly restricted its use.

After long study and experiment, I have discovered that prepared corn cobs are an ideal vehicle or carrier for mercury, and possess both physical and chemical characteristics which enable it to be used for its intended purposes in a most efficient manner. Among these advantages may be mentioned that (a) they are a very superior absorbent for the metallic mercury; (b) they contain a large percentage of oxygen, approximately 40 percent; (c) they ignite readily, at a low temperature, in fact can be ignited by a match, thereby dispensing with the employment of oxidizing agents or special igniting means; (d) in burning, they glow or smolder uniformly analogous to charcoal, and (e) they volatilize the mercury slowly and uniformly.

In practice, the corn cobs, after removal of the corn kernels, are first dried in the open air or otherwise. They are then ground finely, say to a degree resembling ordinary corn meal. The ground corn cobs are then preferably subjected to a sterilizing treatment so as to destroy any bacteria which might be present. This may be done by spraying with a solution of formaldehyde, say a one-tenth percent of "formalin", this latter being a forty percent solution of formaldehyde gas. To 20 grams of the dried sterilized corn cob meal is added about 48 cc. of water, and, after thorough mixing, 20 grams of mercury are "rubbed up" therewith and thoroughly and uniformly incorporated therein. The resulting "mass" is molded into 12 wafers and allowed to dry, preferably for three or four days in the open air. Each of the wafers contains the required dosage of mercury for a single treatment.

The wafers are used in one of the several ways well known to the profession, and they may be administered with such frequency as appeals to the judgment of the physician prescribing them. Their administration ordinarily requires from 10 to 15 minutes.

The specific invention described does not impose limitations on the scope of the invention with reference to proportions or character of the ingredients used, the substitution of equivalents, the employment of additional ingredients, etc., said invention being as broad as is commensurate with the appended claims.

Having thus fully described the invention, what I claim as new and desire to secure by Letters Patent is:

1. A medicinal composition containing dried corn cobs as a combustible base and metallic mercury, said combustible base having a relatively low ignition point and, when ignited, burning with a slow glowing action.

2. A medicinal composition consisting of dried corn cobs as a combustible base and metallic mercury finely disseminated throughout the same, said combustible base having a relatively low ignition point and, when ignited, burning with a slow glowing action.

3. A medicinal wafer formed from sterilized corn cob meal as a combustible base and containing metallic mercury, said combustible base having a relatively low ignition point and, when ignited, burning with a slow glowing action.

In testimony whereof I have signed the foregoing specification.

JOSEPH W. STEVENS.